(No Model.)
R. N. ALLEN.
Car. Wheel.
No. 238,475.  Patented March 1, 1881.
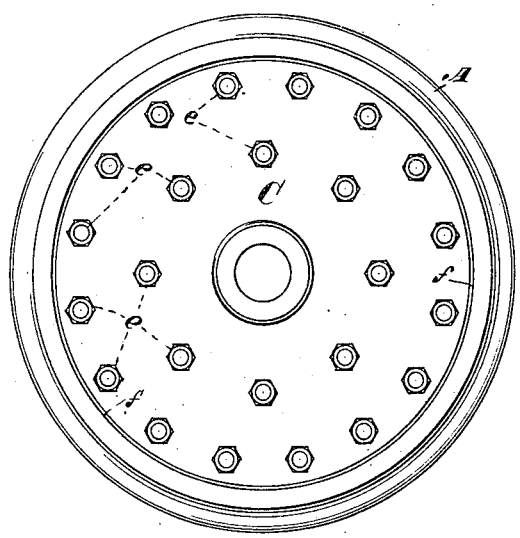
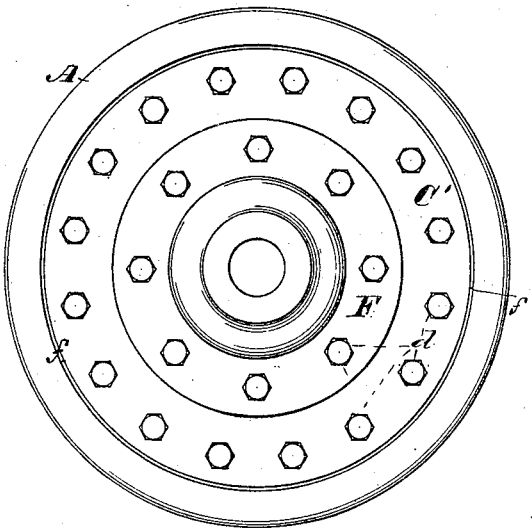
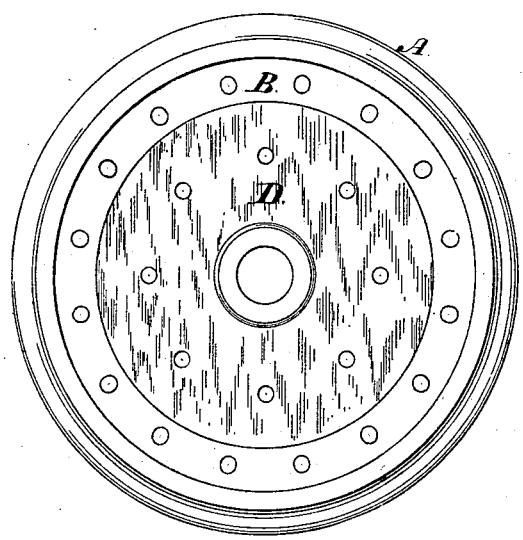
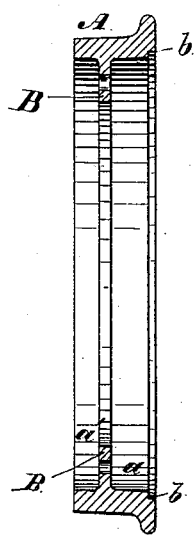
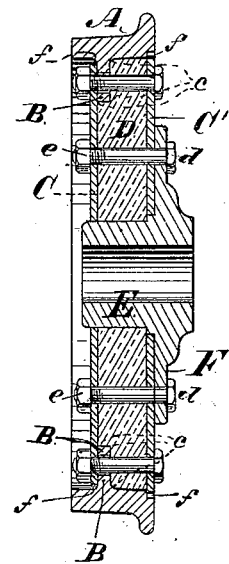
Witnesses:
Henry Giehling
Robert H. Duncan
Inventor:
Richard N Allen

UNITED STATES PATENT OFFICE.

RICHARD N. ALLEN, OF HUDSON, NEW YORK.

CAR-WHEEL.

SPECIFICATION forming part of Letters Patent No. 238,475, dated March 1, 1881.

Application filed June 24, 1880. (No model.) Patented in England August 14, 1874.

*To all whom it may concern:*

Be it known that I, RICHARD N. ALLEN, of Hudson, in the county of Columbia and State of New York, have invented a new and useful Improvement in Car-Wheels, of which the following is a specification.

The present invention relates to an improvement on the construction of car-wheels as set forth in Reissued Letters Patent No. 7,142, of May 30, 1876, and has for its main object the combination of a tire with the central portion or body of the wheel, the two being so constructed and arranged that the tire can be readily removed and a new one substituted without injury to or material disturbance of the body of the wheel.

The invention is illustrated in the accompanying drawings, in which Figure 1 is a plan view of the front side of the wheel. Fig. 2 is a plan view of the back side of the wheel. Fig. 3 is a plan view of the front side of the wheel with the side plate detached. Fig. 4 is a transverse sectional view of the tire. Fig. 5 is a transverse sectional view of a wheel.

The construction shown in Figs. 1, 2, 3, 4, and 5 of the drawings is substantially the same as that described and shown in said reissued patent, No. 7,142, with the exception, however, that the flange or web formed upon the inner side or face of the rim or tread of the tire, instead of being located at or near the central line of such rim and extending nearly to the hub of the wheel, is located considerably to one side or off of such central line, and extends to only a comparatively short distance from the rim; and also, instead of the core or paper filling being in two parts or disks, as shown in said reissued patent, it is, in the present invention, a single solid disk with an annular rabbet formed upon the edge of one of its sides, into which the flange or web of the tire fits.

In Figs. 1, 2, 3, 4, and 5 of the drawings, A represents a tire, preferably forged and rolled from an ingot of steel or iron, so that it will be free from any weld or joint.

B is an annular flange or web formed upon the inner side of the rim or tread of the tire, and so located thereon as to leave recesses *a* and *a'* upon either side of the flange or web, the recess *a* being considerably wider than the recess *a'*; and the flange or web is provided with a series of bolt-holes, which are slightly elongated in the direction of the radii of the wheels. The back side edge of the tire is provided with a rabbet, *b*, to receive the edge of the back-plate, C'.

D is a circular core or disk of prepared paper, preferably compressed paper or equivalent material, having a central circular bore of a size just sufficient to permit the core to be slipped upon the sleeve of the hub, and having a rabbet, *c*, extending around the edge of one of its sides to receive the flange or web B of the tire. There is also an outer and inner series of bolt-holes formed through this core, which are slightly of less diameter than the bolts to be used.

C and C' are metallic plates with central circular holes to fit the hub, each of which is provided with outer and inner series of bolt-holes to match the holes in the flange or web of the tire and in the core D.

E is a hub, constructed with a flange, F, which is provided with a series of holes to match with the inner rows of holes in the plates C and C' and in the core D when these parts are brought into their final position.

The several parts above described and shown in the drawings—viz., the tire A, the plates C and C', the core D, and the hub E—are combined to form a wheel, as shown in Fig. 5, in the following way: The plate C' and the core D are slipped onto the sleeve of the hub and forced into their places. The tire is then forced onto the core, the periphery of the core being brought into close contact with the inner side of the tread of the tire and filling the recess *a*, and the flange or web B filling the rabbet *c* of the core and coming out flush with the front side of the same; and to facilitate this operation and make a close fit both the periphery of the core and the inner side of the rim of the tire against which it abuts may be slightly beveled or inclined, as shown in Fig. 5. The plate C is then forced into its place upon the hub and the several parts secured firmly together by bolts *d d* and nuts *e e*. It is evident that when the parts are brought together they must be so disposed that the several rows of bolt-holes will match.

It is observed that the circumferential edges of the plates C and C' do not abut or come in close contact with the tire, a small annular space, f, being left between them, and consequently the tire rests entirely upon, and is supported by the periphery of the core D and by the head of the rabbet c, which is filled by the flange or web B, so that the blows and shocks received by the tire are communicated directly to the central core of paper or equivalent material, and largely absorbed thereby. The position of the flange or web B toward one side of the rim of the tire rather than at or near its center, and of the rabbet c upon the edge of the core D, enables a single solid core having sufficient thickness to accomplish the object for which it is employed—viz., to absorb the shocks and blows received by the tire—to be securely united to one side only of the flange or web B, so that the tire can be easily removed when worn out and a new one substituted without removing or materially disturbing the central part of the wheel. The tire can be removed by simply unscrewing the nuts upon the front side of the wheel, removing the front plate, C, and then the tire can be forced off without any other displacement of the parts.

What is claimed as new is—

The combination, in a car-wheel, of a metallic tire provided with an annular flange or web, B, formed upon the inner side of its rim or tread, and located off of the central line of such rim or tread, a core, D, of prepared paper or equivalent material, provided with an annular rabbet, c, upon the edge of one of its sides, metallic plates C and C', and hub E, secured together substantially as described.

RICHARD N. ALLEN.

Witnesses:
E. T. KELLEY,
P. MILLER.